United States Patent
Westerdale et al.

(12) 
(10) Patent No.: US 6,637,796 B1
(45) Date of Patent: Oct. 28, 2003

(54) VEHICLE TAILGATE HINGE AND COUNTERBALANCE ASSEMBLY

(75) Inventors: David L. Westerdale, Monroe, MI (US); Dennis D. Schwaiger, Whitmore Lake, MI (US); Curt D. Campbell, Farmington Hills, MI (US)

(73) Assignee: Midway Products Group, Inc., Monroe, MI (US)

( * ) Notice: Subject to any disclaimer, the term of this patent is extended or adjusted under 35 U.S.C. 154(b) by 0 days.

(21) Appl. No.: 10/301,938

(22) Filed: Nov. 22, 2002

(51) Int. Cl.[7] .............................................. B62D 25/00
(52) U.S. Cl. ........................................ 296/57.1; 296/56
(58) Field of Search ............................ 296/57.1, 50, 61, 296/56, 26.11, 146.8, 100.1, 100.06, 106, 76, 146.1; 414/537, 545; 49/386, 40, 340

(56) References Cited

U.S. PATENT DOCUMENTS

| | | | | |
|---|---|---|---|---|
| 2,984,517 A | * | 5/1961 | Farrow et al. ............. | 296/57.1 |
| 3,031,225 A | | 4/1962 | Saffer et al. | |
| 3,336,070 A | * | 8/1967 | Jackson ..................... | 296/57.1 |
| 3,612,601 A | * | 10/1971 | Himka et al. ............. | 296/57.1 |
| 3,643,378 A | * | 2/1972 | Velavicius et al. ......... | 296/57.1 |
| 3,649,067 A | * | 3/1972 | Louton, Jr. ................. | 296/50 |
| 3,699,716 A | * | 10/1972 | Wanlass ....................... | 49/40 |
| 3,713,472 A | * | 1/1973 | Dozois ........................ | 296/56 |
| 3,716,945 A | * | 2/1973 | Cooper et al. ............... | 296/56 |
| 3,851,867 A | * | 12/1974 | Fricko ........................ | 296/56 |
| 4,143,904 A | * | 3/1979 | Cooper et al. ............. | 296/57.1 |
| 4,359,119 A | * | 11/1982 | Kammerman .............. | 296/57.1 |
| 4,580,315 A | | 4/1986 | Beckwith | |
| 4,601,446 A | * | 7/1986 | Opsahl ........................ | 49/386 |
| 5,358,301 A | * | 10/1994 | Konchan et al. ......... | 296/146.1 |
| 5,448,856 A | * | 9/1995 | Moore et al. ................. | 49/340 |
| 5,531,498 A | * | 7/1996 | Kowall ..................... | 296/146.8 |
| 5,771,540 A | | 6/1998 | Carpenter et al. | |
| RE36,267 E | * | 8/1999 | Moore et al. ................. | 49/340 |
| 5,960,519 A | | 10/1999 | Thompson et al. | |
| 5,988,724 A | * | 11/1999 | Wolda ........................ | 296/57.1 |
| 6,092,336 A | * | 7/2000 | Wright et al. ................. | 296/56 |
| 6,318,025 B1 | * | 11/2001 | Sedlak ........................ | 296/56 |
| 6,341,809 B1 | * | 1/2002 | Chapman ..................... | 296/56 |
| 6,425,205 B2 | * | 7/2002 | Wygle et al. ................. | 296/56 |
| 6,520,557 B2 | * | 2/2003 | Benthaus et al. ............. | 296/76 |
| 2002/0167188 A1 | * | 11/2002 | Zagaroff .................... | 296/57.1 |

* cited by examiner

Primary Examiner—Kiran Patel
(74) Attorney, Agent, or Firm—Brooks Kushman P.C.

(57) ABSTRACT

A vehicle hinge and counterbalance assembly (34) for pivotally mounting a lateral end of a vehicle tailgate (26) at a lower extremity thereof for movement of the tailgate on an associated vehicle between an upper closed position and a lower opened position and for also providing counterbalancing of the tailgate.

14 Claims, 3 Drawing Sheets

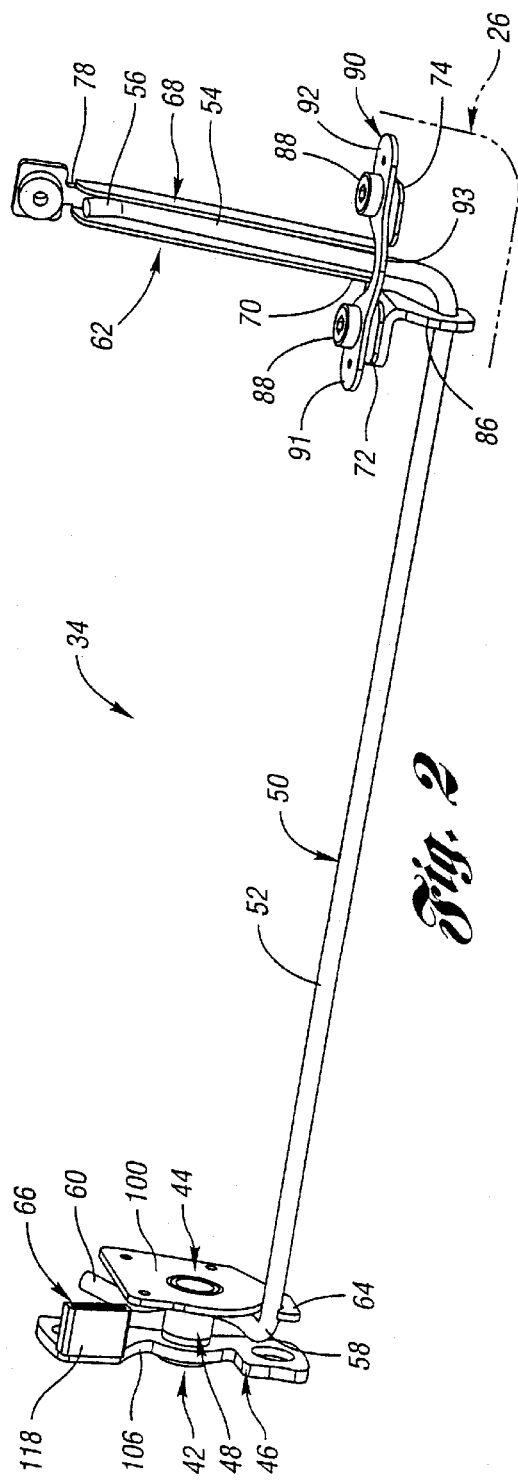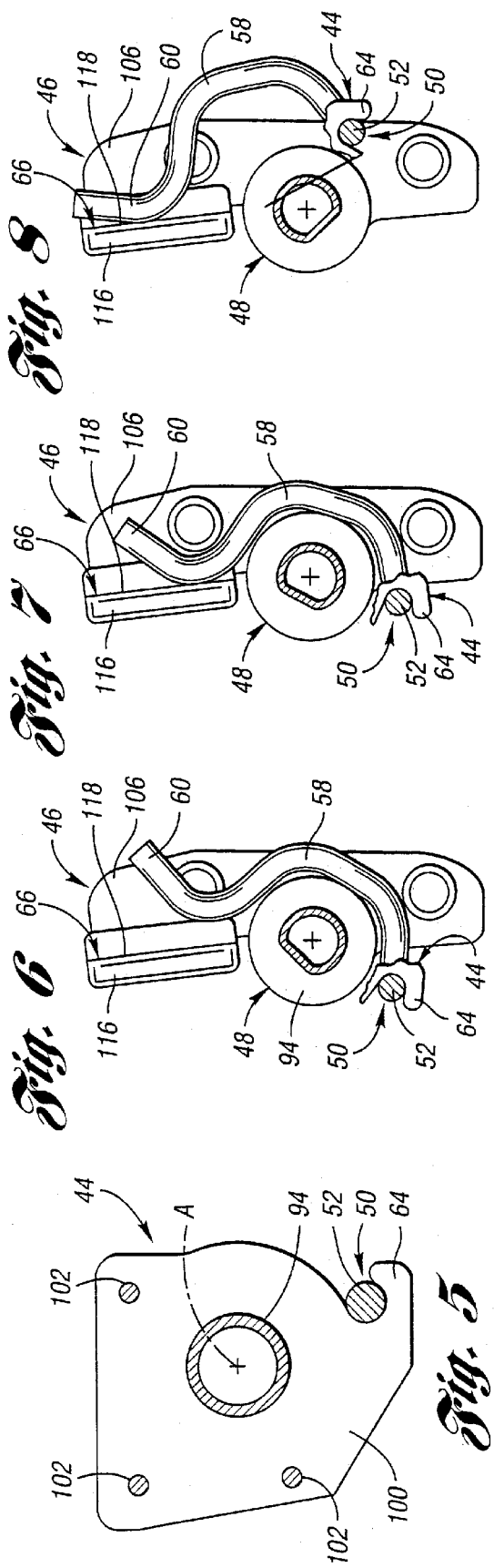

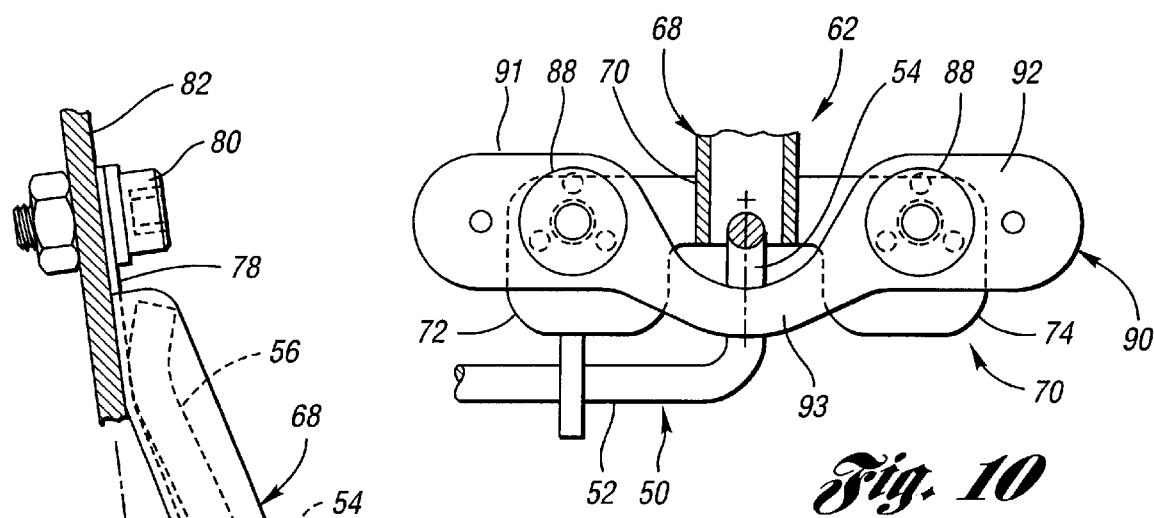
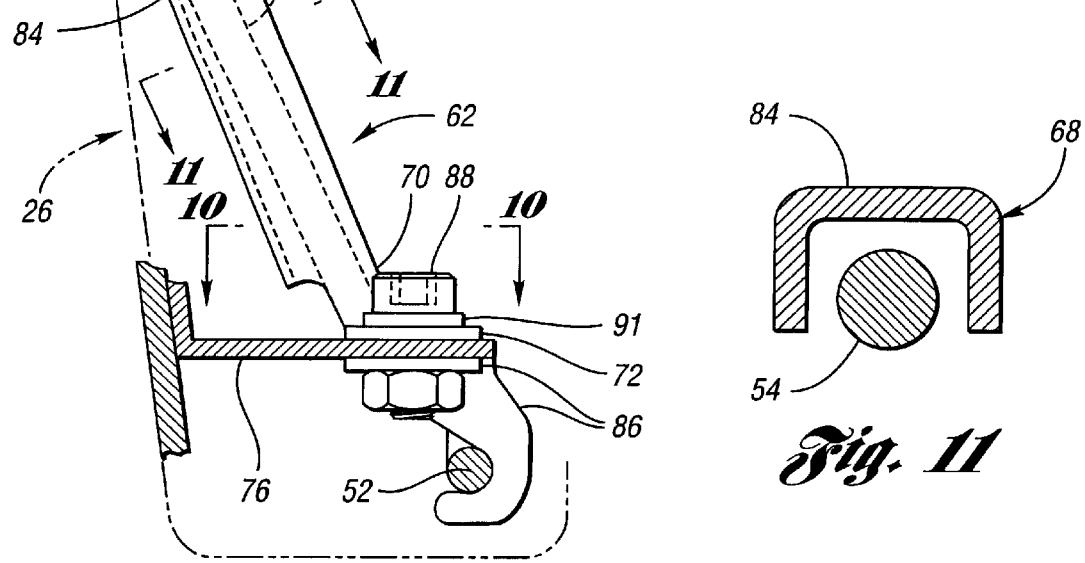
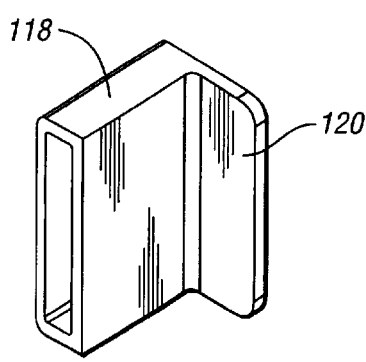
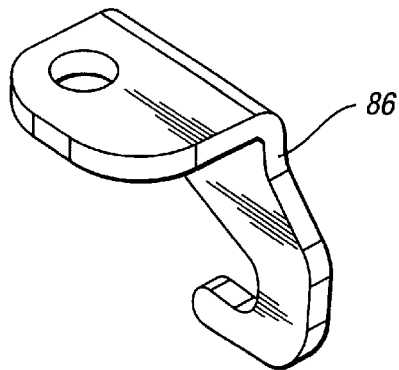

VEHICLE TAILGATE HINGE AND COUNTERBALANCE ASSEMBLY

BACKGROUND OF THE INVENTION

1. Field of the Invention

This invention relates to a hinge and counterbalance assembly for pivotally mounting a lateral end of a vehicle tailgate at a lower extremity thereof for movement of the tailgate on an associated vehicle between an upper closed position and a lower open position and for also providing counterbalancing of the tailgate during a portion of such movement.

2. Background Art

Vehicle tailgates for trucks or other passenger vehicles have previously included counterbalance and hinge mechanisms for mounting the lower extremity of a tailgate at opposite lateral ends thereof for movement between an upper open position and a lower closed position as well as providing counterbalancing during movement between these positions. As disclosed by U.S. Pat. Nos. 5,358,301 Konchan et al. and U.S. Pat. No. 5,988,724 Wolda, the hinge utilized can also cooperate with another associated hinge to permit removal of the tailgate, which is often done with the tailgate midway between its open and closed positions, where a stationary hinge member on the vehicle has a slot that permits withdrawal of a pivotal tongue type hinge member on the tailgate by upward and rearward movement of the tailgate and then lateral movement to release the tailgate at a hinge adjacent its other lateral end.

Vehicles, of course, have also included other rear gates such as lift gates as disclosed by U.S. Pat. No. 5,960,519 Thompson et al., which is assigned to the assignee of the present application, where a hinge and counterbalance assembly provides counterbalancing during the final portion of opening movement.

Other prior art references noted during an investigation conducted in connection with the present invention include U.S. Pat. Nos. 2,984,517 Farrow et al.; U.S. Pat. No. 3,031,225 Saffer et al.; U.S. Pat. No. 3,336,070 Jackson; U.S. Pat. No. 3,643,378 Velavicius et al; U.S. Pat. No. 4,143,904 Cooper et al.; U.S. Pat. No. 4,580,315 Beckwith; and U.S. Pat. No. 5,771,540 Carpenter et al.

SUMMARY OF THE INVENTION

An object of the present invention is to provide an improved vehicle tailgate hinge and counterbalance assembly.

In carrying out the above object, the vehicle tailgate hinge and counterbalance assembly pivotally mounts a lateral end of a vehicle tailgate at a lower extremity thereof for movement of the tailgate on an associated vehicle between an upper closed position and a lower open position and the assembly also provides counterbalancing of the tailgate. The assembly includes a hinge having a first hinge member for mounting on the tailgate and also has a second hinge member for mounting on the vehicle. A pivotal connection pivotally connects the hinge members to support the tailgate for movement about a pivotal axis between the closed and open positions. A torsion rod of the assembly has an intermediate portion that extends within the tailgate laterally inward from the hinge. An inner end of the torsion rod extends transversely from the intermediate portion thereof within the tailgate and has a distal end portion. An outer end of the torsion rod is located outwardly of the tailgate adjacent the hinge and extends transversely from the intermediate portion terminating in a distal end portion. Within the tailgate, a tailgate brace of the assembly engages the distal end portion of the inner end of the torsion rod to limit rotation of the torsion rod during opening and closing movement of the tailgate. The first hinge member of the hinge has a positioner that positions the intermediate portion of the torsion rod spaced from the pivotal connection of the hinge, and the outer end of the torsion rod extends from the positioner of the first hinge member around the pivotal connection of the hinge to its distal end portion. The second hinge member of the hinge has an engagement portion that is spaced from the distal end portion of the outer end of the torsion rod when the tailgate is in its closed position, and the engagement portion is engaged by the distal end portion of the outer end of the torsion rod after the tailgate has moved toward its open position to provide counterbalance of the tailgate during movement between a partial open position and the open position.

In its preferred construction, the hinge and counterbalance assembly includes a tailgate brace having an elongated member which includes a first end having a pair of oppositely extending mounting flanges for attachment to the tailgate adjacent its lower extremity. A second end of the brace has a mounting flange for attachment to the tailgate at a remote location from its lower extremity. An intermediate portion of the brace extends between its first and second ends with a U-shaped cross section in which the distal end portion of the inner end of the torsion rod is engaged with the brace to limit the rotation of the torsion rod. The tailgate brace also includes a positioner that engages and locates the intermediate portion of the torsion rod on the opposite side of the first end of the elongated brace member from the second end of the brace member. The positioner of the tailgate brace is secured to one side of one of the mounting flanges of the first end of the elongated brace member. An attachment plate of the tailgate brace is secured to the other side of the one mounting flange of the first end of the elongated brace member and is also secured to the other mounting flange of the first end of the elongated brace member with the inner end of the torsion rod located between the brace member and the attachment plate within the U-shaped cross section of the brace member. More specifically, the attachment plate has opposite ends that are respectively secured to the pair of mounting flanges of the first end of the brace member, and the attachment plate also has a curved intermediate portion that connects its opposite ends and extends around the inner end of the torsion rod.

The assembly has the pivotal connection of the hinge constructed to include first and second annular connection portions respectively mounted by the first and second hinge members with one of the annular connection portions received within the other one and with the pivotal axis centrally extending through the annular connection portions. An annular bearing is located between the first and second annular connection portions, and the outer end of the torsion rod extends from the positioner of the first member to its distal end portion in a generally diametrically opposite location with respect to the annular connection portions through which the pivotal axis extends.

The construction of the first hinge member of the hinge includes a plate that is secured to the tailgate and also includes an annular connection portion that is secured to its plate extending therefrom, and the plate of the first hinge member supports its torsion rod positioner. The second hinge member includes a plate that is secured to the vehicle and also includes an annular connection portion that is secured to its plate extending therefrom. One of the annular connection portions is received within the other annular connection portion, and an annular bearing is located between the annular connection portions with the pivotal axis extending therethrough. The outer end of the torsion rod extends from the positioner of the first hinge member to its distal end in a generally diametrically opposite location with respect to the annular connection portions through which the pivotal axis extends. The annular bearing is made from plastic and has one axial end secured to the plate of one of the hinge member. Furthermore, the plate of the first hinge member includes a hook that embodies the torsion rod positioner for positioning the torsion rod adjacent its outer end.

The plate of the second hinge member of the hinge includes an annular engagement flange that embodies the engagement portion which is spaced from the distal end of the outer end of the torsion rod when the tailgate is in its closed position and which is engaged by the distal end of the outer end of the torsion rod after the tailgate has moved toward its open position to provide counterbalancing of the tailgate upon further movement toward the open position. This engagement flange of the plate of the second hinge member includes a wear pad shaped as a sleeve that receives the engagement flange for mounting.

The objects, features and advantages of the present invention are readily apparent from the following detailed description of the preferred embodiment when taken in connection with the accompanying drawings.

BRIEF DESCRIPTION OF THE DRAWINGS

FIG. 2 is a perspective view illustrating the hinge and counterbalance assembly of the invention.

FIG. 5 is a view taken in the opposite direction as FIG. 3 to illustrate a tailgate mounted hinge member plate of the hinge.

FIG. 6 is a view taken in the opposite direction as FIG. 5 to illustrate the vehicle mounted hinge member with the tailgate in a closed position where an outer end of a torsion rod of the assembly is spaced from an engagement portion of a vehicle mounted hinge member.

FIG. 7 is a view similar to FIG. 6 after partial opening of the tailgate where the outer end of the torsion rod is initially engaged with the engagement portion to commence counterbalancing upon further tailgate opening in a downward direction.

FIG. 8 is a view similar to FIG. 7 at a further stage of the tailgate opening to illustrate the movement of the outer end of the torsion rod.

FIG. 9 is a partial sectional view taken along the direction of line 9—9 in FIG. 1 to illustrate a tailgate brace that positions an inner end of the torsion rod.

FIG. 10 is a partial sectional view taken along the direction of line 10—10 in FIG. 9 to further illustrate the construction of the tailgate brace and the inner end of the torsion rod.

FIG. 11 is a sectional view taken along the direction of line 11—11 in FIG. 9 to illustrate the manner in which the inner end of the torsion rod is received within a U-shaped cross section of the an elongated member of the tailgate brace.

FIG. 12 is perspective view that illustrates a wear pad of the assembly for engaging the outer end of the torsion rod as illustrated in FIGS. 7 and 8.

FIG. 13 is a perspective view that illustrates a torsion rod positioner of the tailgate brace that positions the intermediate portion of the torsion rod and its inner end within the tailgate.

DETAILED DESCRIPTION OF THE PREFERRED EMBODIMENTS

Figure 1:
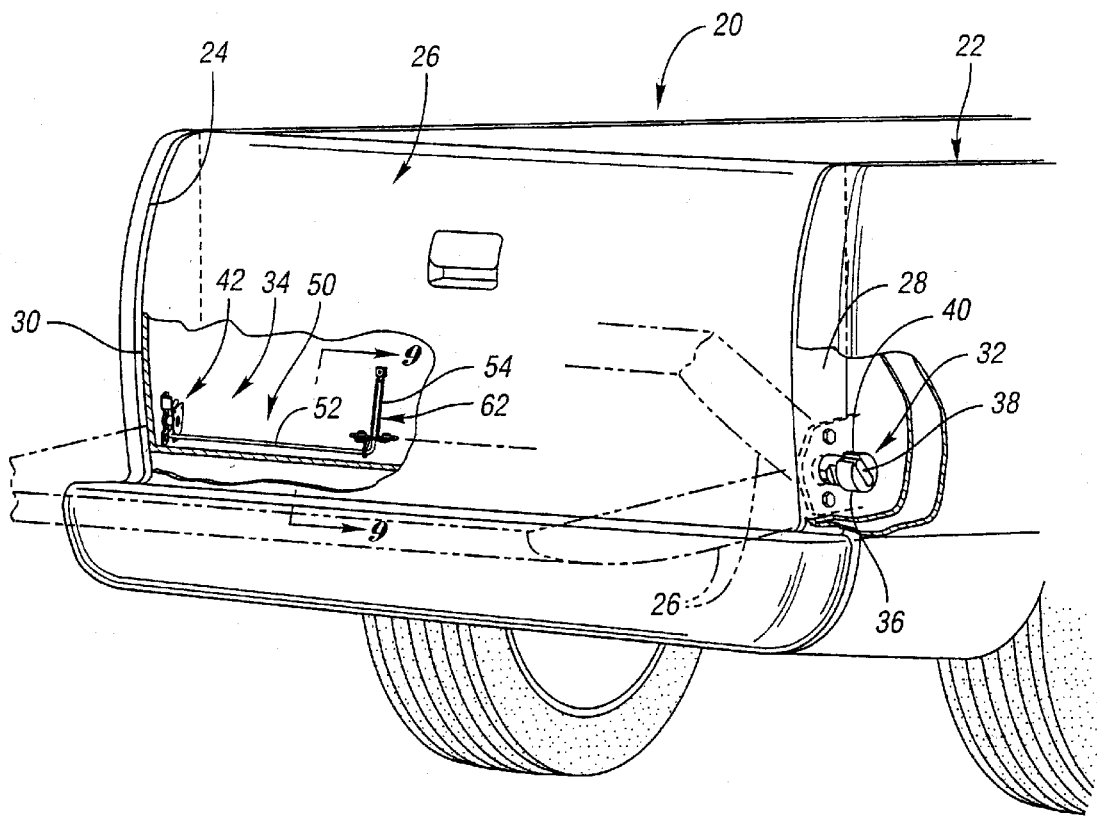
FIG. 1 is a partially broken away perspective view of the rear end of a vehicle which includes a tailgate having a hinge and counterbalance assembly constructed in accordance with the present invention.

With reference to FIG. 1, a vehicle generally indicated by 20 is actually constructed as a truck including a rear bed 22 having a rear opening 24 that is opened and closed by a tailgate generally indicated by 26 as is hereinafter more fully described. A lower extremity of the tailgate 26 is mounted at respective opposite ends 28 and 30 thereof by a releasable hinge 32 and a hinge and counterbalance assembly 34 constructed in accordance with the present invention. It should be appreciated that while the hinge and counterbalance assembly 34 has been illustrated with a truck bed tailgate 26, it also can be used with other vehicle tailgates that pivot about their lower extremities, that being the lower extremity of the tailgate when it is in its upper closed position extending generally vertically, such as with station wagons and sport utility vehicles or any other vehicle having an opening to which at times access is required while closure thereof is required at other times.

With continuing reference to FIG. 1, the releasable hinge 32 includes a receptacle member 36 that is mounted on the vehicle and receives a tailgate movable pintle 38 to permit movement of the tailgate 26 between the upper closed position shown by solid line representation and the lower generally horizontally extending open position shown by phantom line representation while moving through the partially open position shown partially by phantom line representation where the tailgate is generally at a 45 degree angle with respect to the horizontal. In this partially open position, the tongue shaped pintle 38 on the tailgate is aligned with a slot 40 in the vehicle mounted hinge member 36 so that the tailgate can be moved upwardly and rearwardly for release from the vehicle at its associated end. After such release, the hinge and counterbalance assembly 34 of this invention also permits release of the tailgate by movement along its lower extremity away from the adjacent side of the truck bed opening 24 so that the truck can be utilized without the tailgate. Such tailgate removal allows more convenient access to the truck in certain uses such as when there is a need to attach a trailer to a hitch while still having access to the truck bed 22, etc.

Figure 3:
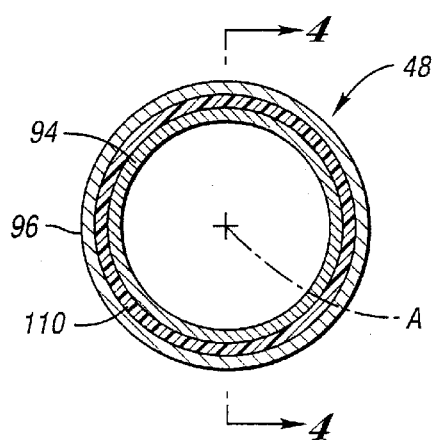
FIG. 3 is a sectional view taken along the direction of line 3—3 in FIG. 2 to illustrate the hinge of the assembly.
Figure 4:
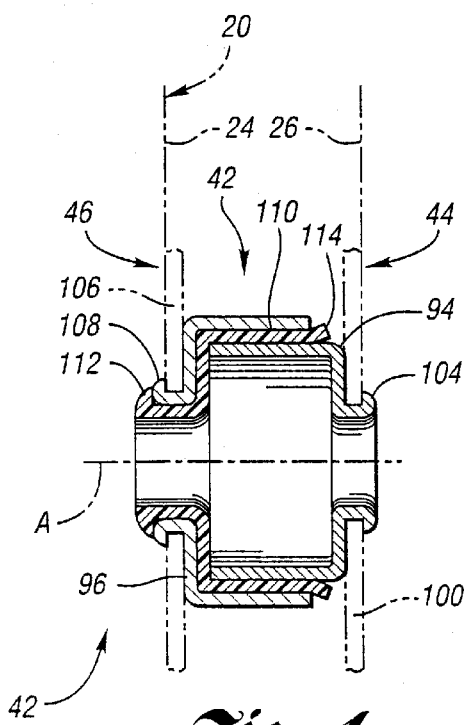
FIG. 4 is a sectional view taken along the direction of line 4—4 in FIG. 3 to further illustrate the construction of the hinge.

With reference to FIG. 2, the hinge and counterbalance assembly 34 of this invention includes a hinge 42 that is also illustrated in FIG. 4 as including a first hinge member 44 for mounting on the tailgate and a second hinge member 46 for mounting on the vehicle. A pivotal connection 48 best shown in FIGS. 3 and 4 pivotally connects the hinge members 46 and 48 to support the tailgate for movement about a pivotal axis A between the closed and open positions previously described in connection with FIG. 1. As is hereinafter more fully described, the pivotal connection 48 is detachable to permit the tailgate removal as was also previously described.

With reference back to FIG. 2, the assembly 34 also includes a torsion rod 50 having an intermediate portion 52 of an elongated shape that extends laterally inwardly with respect to the vehicle from the hinge 42 within the tailgate. The torsion rod 50 has an inner end 54 that extends transversely from the intermediate portion 52 thereof within the tailgate and has a distal end portion 56 also shown in FIG. 9. An outer end 58 of the torsion rod 50 is located outwardly of the tailgate adjacent the hinge 42 extending transversely from the intermediate portion 52 of the torsion rod and like the inner end has a distal end portion 60.

As shown in both FIGS. 2 and 9, the assembly 34 also includes a tailgate brace 62 that is located within the tailgate and engages the distal end portion 56 of the inner end 54 of torsion rod 50 to limit rotation of the torsion rod during opening and closing movement of the tailgate as is hereinafter more fully described.

As illustrated in FIGS. 2 and 5, the first hinge member 44 on the tailgate has a positioner 64 that positions the intermediate portion 52 of torsion rod 50 spaced from the pivotal axis A of the pivotal connection of the hinge. The outer end 58 of the torsion rod 50 extends from the positioner 64 as shown in FIG. 6 around the pivotal connection 48 of the hinge to its distal end portion 60. More specifically, the outer end 58 of the torsion rod has a curved shape so the intermediate portion 52 and the distal end portion 60 are located at generally diametrically opposite locations with respect to the hinge pivotal axis A.

With continuing reference to FIG. 6, the second hinge member 46 has an engagement portion 66 that is spaced from the distal end portion 60 of the outer end 58 of the torsion rod when the tailgate is in its closed position which is the generally vertically extending position shown by solid line representation in FIG. 1 as previously described. After partial movement of the tailgate toward its open position, normally on the order of 15 to 45 degrees, the engagement portion 66 of the second hinge member 46 is engaged as shown in FIG. 7 by the distal end portion 60 of the outer end 58 of torsion rod such that further movement of the tailgate toward its closed position provides counterbalancing. More specifically, prior to such further opening movement, the tailgate mounted hinge member 44 pivots counterclockwise from the position of FIG. 6 to the position of FIG. 7 where the distal end portion 60 of the outer torsion rod end 58 engages the engagement portion 66 on the body mounted hinge member 46. Thereafter, during continued downward tailgate opening movement, the tailgate mounted hinge member 44 continues to rotate counterclockwise about the central axis A and the engagement of the distal end portion 60 of the outer torsion rod end 58 rotates the intermediate torsion rod portion 52 to provide torquing that provides the counterbalancing until reaching the final position of FIG. 8 where the tailgate is in the fully open position after having rotated approximately 90 degrees from the closed position. The torque arm between the center of the intermediate torsion rod portion 52 and the engagement of the distal end portion 60 of the outer torsion rod end 58 is longer than the distance between the central axis A and the engagement between the engagement portion 66 and the distal end portion 60 such that there is less angular movement of the torsion rod. This allows the use of a more heavy duty torsion rod which twists less than lighter duty torsion rods and provides a greater lifetime of use.

As illustrated in FIGS. 2, 9 and 10, the tailgate brace 62 includes an elongated brace member 68 having a first end 70 including a pair of oppositely extending mounting flanges 72 and 74 for attachment to the tailgate adjacent its lower extremity such as illustrated in FIG. 9 at the attachment flange 76. The elongated tailgate brace member 62 also includes a second end 78 for attachment by a threaded connection 80 as shown in FIG. 9 to the tailgate at a remote location 82 from its lower extremity where the attachment flange 76 is connected to its first end. An intermediate portion 84 of the tailgate brace member 68 extends between its first and second ends 70 and 78 with a U-shaped cross section as best illustrated in FIG. 11. The inner end 54 of the torsion rod is located within the U-shaped cross section of the intermediate portion 84 of the brace member 68 and its distal end portion 56 engages the elongated member to limit rotation of the torsion rod during the counterbalancing previously described as the outer torsion rod end engages the engagement portion 66 of the vehicle mounted hinge member 46 as previously described in connection with FIGS. 6–8.

As illustrated in FIGS. 2, 9, 10 and 13, the tailgate brace 62 also includes a positioner 86 that engages and locates the intermediate portion 52 of the torsion rod 50 on the opposite side of the first end 70 of the elongated brace member 68 from the second end 78 of the brace member. More specifically, the positioner has a hook shape that engages the intermediate portion 52 of the torsion rod as shown in FIG. 9 and is secured to one side of the one mounting flange 72 of the first end 70 of the elongated brace member 68 by a threaded connection 88. The tailgate brace 62 also includes an attachment plate 90 that is secured to the other side of the one mounting flange 72 of the first end 70 of the elongated brace member by the threaded connection 88 and is also secured to the other mounting flange 74 of the first end of the elongated brace member by a similar threaded connection 88 as shown in FIG. 10 with the inner end 54 of the torsion rod located between the brace member and the attachment plate within the U-shaped cross section of the brace member. As best shown in FIG. 10, the attachment plate 90 has opposite ends 91 and 92 that are respectively secured to the tailgate attachment flange 76 and to the brace member mounting flanges 72 and 74 by the associated threaded connections 88, and the attachment plate has a curved intermediate portion 93 that connects its opposite ends and exterids around the inner end 54 of the torsion rod.

With reference to FIG. 4 and also concomitant reference to FIG. 3, the pivotal connection 48 of the hinge 42 includes first and second annular connection portions 94 and 96 respectively mounted on the first and second hinge members 44 and 46 with one of the annular connection portions 94 received within the other annular connection portion 96 and with the pivotal axis A centrally extending through the annular connection portions. As shown in FIG. 6, the outer end 58 of the torsion rod extends from the positioner 64 of the first hinge member 44 to its distal end portion 60 in a generally diametrically opposite location with respect to the annular connection portions through which the pivotal axis A extends.

With combined reference to FIGS. 4 and 5 the first hinge member 44 of the hinge 48 includes a plate 100 that is secured to the tailgate by connectors 102 (FIG. 5) such as threaded bolts, and the first hinge member also includes the one annular connector 94 previously described in connection with FIGS. 3 and 4. This annular connector 94 actually has a somewhat cup shape whose central portion has a generally round flange 104 providing securement to the hinge plate 100 as shown in FIG. 4. The hinge plate 100 as shown in FIG. 5 supports the torsion rod positioner 64 of the first hinge member 44.

As shown in FIG. 4, the vehicle body mounted hinge member 46 includes a hinge plate 106 that is secured to the vehicle body adjacent one end of its tailgate bed opening 24 in any suitable manner such as by unshown threaded connectors. The vehicle body mounted hinge member 46 also includes the other annular connection portion 96 that is secured to the hinge plate 106 by a generally round flange 108 and extends inwardly from the hinge plate 106 toward the tailgate mounted hinge member plate 100. The annular connection portion 96 on the vehicle body mounted hinge member 46 receives the annular connection portion 94 on the tailgate mounted hinge member 44 and permits withdrawal therefrom during tailgate removal as previously described in connection with FIG. 1. An annular bearing 110 is located between the annular connection portions 94 and 96 with the pivotal axis A extending therethrough. This annular bearing 110 includes a generally round flange 112 that provides securement of the bearing to the vehicle body mounted hinge member 46 so that the bearing remains in position when the tailgate is removed as the annular connection portion 94 is withdrawn from the annular connection portion 96 during tailgate removal. In that connection, the inward end of the annular bearing 10 has an outwardly extending mouth 114 that facilities the reinsertion during remounting of the tailgate. The annular bearing 10 is made of plastic so as to be lubricious in providing the hinge mounting of the tailgate on the vehicle. Furthermore, as previously mentioned in connection with FIG. 6, the outer end 58 of the torsion rod extends from the positioner 64 to its distal end portion 60 at a generally diametrically opposite location with respect to the annular connection portions through which the pivotal axis A extends.

As shown in FIG. 5, the plate 100 of the tailgate mounted hinge member 44 includes a hook that embodies the positioner 64 for engaging the intermediate torsion rod portion 52 adjacent its outer end, just like the hook type positioner 86 shown in FIG. 13 for engaging the intermediate torsion rod portion adjacent its inner end as previously described in connection with FIGS. 2, 9 and 10.

As shown in FIG. 6, the hinge plate 106 of the vehicle body mounted hinge member 46 includes an engagement flange 116 that embodies the engagement portion 66 which is spaced from the distal end 60 of the outer end 58 of the torsion rod when the tailgate is in its closed position and which is engaged by the distal end of the outer end of the torsion rod after the tailgate has moved toward its open position as previously described in connection with FIG. 7 to provide counterbalancing of the tailgate upon further movement toward the open position as illustrated in FIG. 8. The engagement flange 116 of the vehicle body mounted hinge member plate 106 includes a wear pad 118 which, as shown in FIG. 12, is shaped as a sleeve and receives the engagement flange for mounting. The wear pad 118 is molded from plastic and has a positioning flange 120 that engages the hinge member plate. Wear pad 118 may be secured to the hinge plate 106 in any suitable manner such as by an interference fit or an adhesive bond.

While the preferred construction of the vehicle tailgate hinge and counterbalance assembly has been described in detail, those familiar to the art to which this invention relates should recognize various alternative designs and embodiments for carrying out the invention as described by the following claims.

What is claimed is:

1. A vehicle tailgate hinge and counterbalance assembly for pivotally mounting a lateral end of a vehicle tailgate at a lower extremity thereof for movement of the tailgate on an associated vehicle between an upper closed position and a lower open position and for also providing counterbalancing of the tailgate, the hinge and counterbalance assembly comprising:

a hinge including a first hinge member for mounting on the tailgate, a second hinge member for mounting on the vehicle, and a pivotal connection that pivotally connects the hinge members to support the tailgate for the movement about a pivotal axis between the closed and open positions;

a torsion rod having an intermediate portion that extends within the tailgate laterally inwardly from the hinge, the torsion rod having an inner end that extends transversely from the intermediate portion thereof within the tailgate and has a distal end portion, and the torsion rod also having an outer end located outwardly of the tailgate adjacent the hinge and extending transversely from the intermediate portion and having a distal end portion;

a tailgate brace located within the tailgate and engaging the distal end portion of the inner end of the torsion rod to limit rotation of the torsion rod during opening and closing movement of the tailgate;

the first hinge member having a positioner that positions the intermediate portion of the torsion rod spaced from the pivotal axis of the pivotal connection of the hinge, and the outer end of the torsion rod extending from the positioner of the first hinge member around the pivotal connection of the hinge to its distal end portion; and the second hinge member having an engagement portion that is spaced from the distal end portion of the outer end of the torsion rod when the tailgate is in its closed position and that is engaged by the distal end portion of the outer end of the torsion rod after the tailgate has moved toward its open position to provide counterbalancing of the tailgate.

2. A vehicle tailgate hinge and counterbalance assembly as in claim 1 wherein the tailgate brace includes an elongated member having: a first end including a pair of oppositely extending mounting flanges for attachment to the tailgate adjacent its lower extremity, a second end having a mounting flange for attachment to the tailgate at a remote location from its lower extremity, and an intermediate portion that extends between the first and second ends with a U-shaped cross section in which the distal end portion of the inner end of the torsion rod is engaged with the brace to limit the rotation of the torsion rod.

3. A vehicle tailgate hinge and counterbalance assembly as in claim 2 wherein the tailgate brace also includes a positioner that engages and locates the intermediate portion of the torsion rod on the opposite side of the first end of the elongated brace member from the second end of the brace member.

4. A vehicle tailgate hinge and counterbalance assembly as in claim 3 wherein the positioner of the tailgate brace is secured to one side of one of the mounting flanges of the first end of the elongated brace member, and the tailgate brace also including an attachment plate that is secured to the other side of the one mounting flange of the first end of the elongated brace member and that is also secured to the other mounting flange of the first end of the elongated brace member with the inner end of the torsion rod located between the brace member and attachment plate within the U-shaped cross section of the brace member.

5. A vehicle tailgate hinge and counterbalance assembly as in claim 4 wherein the attachment plate has opposite ends that are respectively secured to the pair of mounting flanges of the first end of the brace member, and the attachment plate having a curved intermediate portion that connects its opposite ends and extends around the inner end of the torsion rod.

6. A vehicle tailgate hinge and counterbalance assembly as in claim 1 wherein the pivotal connection of the hinge includes first and second annular connection portions respectively mounted by the first and second hinge members with one of the annular connection portions received within the other one and with the pivotal axis centrally extending through the annular connection portions, an annular bearing located between the first and second annular connection portions, and the outer end of the torsion rod extending from the positioner of the first hinge member to its distal end portion at a generally diametrically opposite location with respect to the annular connection portions through which the pivotal axis extends.

7. A vehicle tailgate hinge and counterbalance assembly as in claim 1 wherein the first hinge member of the hinge includes a plate that is secured to the tailgate and also includes an annular connection portion that is secured to its plate extending therefrom, the plate of the first hinge member supporting the torsion rod positioner of the first hinge member, the second hinge member including a plate that is secured to the vehicle, the second hinge member also including an annular connection portion that is secured to its plate extending therefrom, one of the annular connection portions being received within the other annular connection portion, an annular bearing located between the annular connection portions with the pivotal axis extending therethrough, and the outer end of the torsion rod extending from the positioner of the first hinge member to its distal end at a generally diametrically opposite location with respect to the annular connection portions through which the pivotal axis extends.

8. A vehicle tailgate hinge and counterbalance assembly as in claim 7 wherein the annular bearing is made of plastic and has an axial end secured to the plate of one of the hinge members.

9. A vehicle tailgate hinge and counterbalance assembly as in claim 7 wherein the plate of the first hinge member includes a hook that embodies the torsion rod positioner.

10. A vehicle tailgate hinge and counterbalance assembly as in claim 7 wherein the plate of the second hinge member of the hinge includes an engagement flange that embodies the engagement portion which is spaced from the distal end of the outer end of the torsion rod when the tailgate is in its closed position and which is engaged by the distal end of the outer end of the torsion rod after the tailgate has moved toward its open position to provide counterbalancing of the tailgate up on further movement toward the open position.

11. A vehicle tailgate hinge and counterbalance assembly as in claim 10 wherein the engagement flange of the plate of the second hinge member includes a wear pad shaped as a sleeve that receives the engagement flange for mounting.

12. A vehicle tailgate hinge and counterbalance assembly for pivotally mounting a lateral end of a vehicle tailgate at a lower extremity thereof for movement of the tailgate on an associated vehicle between an upper closed position and a lower open position and for also providing counterbalancing of the tailgate, the hinge and counterbalance assembly comprising:

a hinge including a first hinge member for mounting on the tailgate, a second hinge member for mounting on the vehicle, a pivotal connection that pivotally connects the hinge members to support the tailgate for the movement about a pivotal axis between the closed and open positions, the pivotal connection including first and second annular connection portions respectively mounted by the first and second hinge members with one of the annular connection portions received within the other one and with the axis centrally extending through the annular connection portions, and an annular bearing located between the first and second annular connection portions; and the outer end of the torsion rod extending from the intermediate portion of the torsion rod around the pivotal connection of the hinge to its distal end portion at a generally diametrically opposite location with respect to the annular connection portions through which the pivotal axis extends;

a torsion rod having an intermediate portion that extends within the tailgate laterally inwardly from the hinge, the torsion rod having an inner end that extends transversely from the intermediate portion thereof within the tailgate and has a distal end portion, and the torsion rod also having an outer end located outwardly of the tailgate adjacent the hinge and extending transversely from the intermediate portion and having a distal end portion;

a tailgate brace located within the tailgate and including an elongated member having: a first end including a pair of oppositely extending mounting flanges for attachment to the tailgate adjacent its lower extremity, a second end having a mounting flange for attachment to the tailgate at a remote location from its lower extremity, an intermediate portion that extends between the first and second ends with a U-shaped cross section in which the distal end portion of the inner end of the torsion rod is engaged with the brace to limit the rotation of the torsion rod during opening and closing movement of the tailgate, and the tailgate brace also including a positioner that engages and locates the intermediate portion of the torsion rod on the opposite side of the first end of the elongated brace member from the second end of the brace member;

the first hinge member having a positioner that positions the intermediate portion of the torsion rod spaced from the pivotal axis of the pivotal connection of the hinge, and the outer end of the torsion rod extending from the intermediate portion of the torsion rod around the pivotal connection of the hinge to its distal end portion at a generally diametrically opposite location with respect to the annular connection portions through which the pivotal axis extends; and the second hinge member having an engagement portion that is spaced from the distal end portion of the outer end of the torsion rod when the tailgate is in its closed position and that is engaged by the distal end portion of the outer end of the torsion rod after the tailgate has moved toward its open position to provide counterbalancing of the tailgate.

13. A vehicle tailgate hinge and counterbalance assembly as in claim 12 wherein the positioner of the tailgate brace is secured to one side of one of the mounting flanges of the first end of the elongated brace member, and the tailgate brace also including an attachment plate that is secured to the other side of the one mounting flange of the first end of the elongated brace member and that is also secured to the other mounting flange of the first end of the elongated brace member with the inner end of the torsion rod located between the brace member and attachment plate within the U-shaped cross section of the brace member.

14. A vehicle tailgate hinge and counterbalance assembly for pivotally mounting a lateral end of a vehicle tailgate at a lower extremity thereof for movement of the tailgate on an associated vehicle between an upper closed position and a lower open position and for also providing counterbalancing of the tailgate, the hinge and counterbalance assembly comprising:

a hinge including a first hinge member having a plate for mounting on the tailgate, a second hinge member having a plate for mounting on the vehicle, a pivotal connection that pivotally connects the hinge members to support the tailgate for the movement about a pivotal axis between the closed and open positions, the pivotal connection including first and second annular connection portions respectively mounted by the plates of the first and second hinge members with one of the annular connection portions received within the other one and with the pivotal axis centrally extending through the annular connection portions, and an annular plastic bearing located between the first and second annular connection portions;

a torsion rod having an intermediate portion that extends within the tailgate laterally inwardly from the hinge, the torsion rod having an inner end that extends transversely from the intermediate portion thereof within the tailgate and has a distal end portion, and the torsion rod also having an outer end located outwardly of the tailgate adjacent the hinge and extending transversely from the intermediate portion and having a distal end portion;

a tailgate brace located within the tailgate and including an elongated member having: a first end including a pair of oppositely extending mounting flanges for attachment to the tailgate adjacent its lower extremity, a second end having a mounting flange for attachment to the tailgate at a remote location from its lower extremity, and an intermediate portion that extends between the first and second ends with a U-shaped cross section in which the distal end portion of the inner end of the torsion rod is engaged with the brace to limit the rotation of the torsion rod during opening and closing movement of the tailgate, and the tailgate brace also including a positioner that engages and locates the intermediate portion of the torsion rod on the opposite side of the first end of the elongated brace member from the second end of the brace member;

the plate of the first hinge member having a positioner that positions the intermediate portion of the torsion rod spaced from the pivotal axis of the pivotal connection of the hinge, and the outer end of the torsion rod extending from the intermediate portion of the torsion rod around the pivotal connection of the hinge to its distal end portion at a generally diametrically opposite location with respect to the annular connection portions through which the pivotal axis extends; and the plate of the second hinge member having an engagement flange including a wear pad that provides an engagement portion spaced from the distal end portion of the outer end of the torsion rod when the tailgate is in its closed position and which is engaged by the distal end portion of the outer end of the torsion rod after the tailgate has moved toward its open position to provide counterbalancing of the tailgate.

* * * * *